US008052575B2

(12) United States Patent
Albertson et al.

(10) Patent No.: US 8,052,575 B2
(45) Date of Patent: Nov. 8, 2011

(54) ACTIVE FUEL MANAGEMENT MODE TORQUE CONVERTER CLUTCH CONTROL

(75) Inventors: William C. Albertson, Clinton Township, MI (US); Thomas E. Bolander, Flint, MI (US); Joseph R. Dulzo, Novi, MI (US)

(73) Assignee: GM Global Technology Operations LLC

( * ) Notice: Subject to any disclaimer, the term of this patent is extended or adjusted under 35 U.S.C. 154(b) by 881 days.

(21) Appl. No.: 12/100,655

(22) Filed: Apr. 10, 2008

(65) Prior Publication Data
US 2009/0239707 A1    Sep. 24, 2009

Related U.S. Application Data

(60) Provisional application No. 61/037,735, filed on Mar. 19, 2008.

(51) Int. Cl.
*F16H 59/00* (2006.01)

(52) U.S. Cl. .......................................... 477/98

(58) Field of Classification Search ............... 477/53, 477/54, 98, 169, 174
See application file for complete search history.

(56) References Cited

U.S. PATENT DOCUMENTS

| 5,626,535 | A * | 5/1997 | Kono et al. | 477/169 |
| 6,843,752 | B2 * | 1/2005 | Bolander | 477/54 |
| 7,651,441 | B2 * | 1/2010 | Maguire et al. | 477/181 |
| 7,686,112 | B2 * | 3/2010 | Shiiba | 180/65.275 |
| 2006/0207565 | A1 * | 9/2006 | Nishimura | 123/431 |

* cited by examiner

*Primary Examiner* — Justin Holmes
*Assistant Examiner* — Huan Le

(57) ABSTRACT

A system comprises a slip module and a gas temperature module. The slip module adjusts slipping of a clutch of a torque converter based on a first slip value before a cylinder of an engine is deactivated. The gas temperature module determines a temperature of a gas within the cylinder after the cylinder is deactivated. The slip module determines a second slip value based on the temperature of the gas and adjusts the slipping of the clutch based on the second slip value, wherein the second slip value is less than the first slip value.

20 Claims, 5 Drawing Sheets

ACTIVE FUEL MANAGEMENT MODE TORQUE CONVERTER CLUTCH CONTROL

CROSS-REFERENCE TO RELATED APPLICATIONS

This application claims the benefit of U.S. Provisional Application No. 61/037,735, filed on Mar. 19, 2008. The disclosure of the above application is incorporated herein by reference.

FIELD

The present disclosure relates to internal combustion engines and more particularly to torque converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. The engine system 100 includes an engine 102 that produces drive torque. Air is drawn into the engine 102 through an intake manifold 104. A throttle valve 106 varies the volume of air drawn into the intake manifold 104. The throttle valve 106 is actuated by an electronic throttle controller (ETC) 108, thereby controlling opening of the throttle valve 106. The air mixes with fuel provided by a fuel injector 110 to form an air and fuel mixture.

The air/fuel mixture is combusted within one or more cylinders of the engine 102, such as cylinder 112. In various engine systems, such as the engine system 100, combustion of the air/fuel mixture is initiated by spark provided by a spark plug 114. Exhaust gas resulting from combustion is expelled from the cylinders to an exhaust system 116. The engine 102 transfers torque to a transmission 118 via a torque converter 120. The transmission 118 may then transfer torque to one or more wheels of the vehicle.

An intake valve and an exhaust valve are associated with each cylinder of the engine 102. For example, intake valve 122 and exhaust valve 124 are associated with the cylinder 112. Generally, opening of the intake and exhaust valves 122 and 124 is regulated based on rotation of a camshaft (not shown). However, the opening of the intake valve 122 and the exhaust valve 124 may be adjusted by an intake cam phaser 126 and an exhaust cam phaser 128, respectively.

An engine control module (ECM) 150 regulates torque output by the engine 102. The ECM 150 may regulate torque output of the engine 102 to, for example, meet torque demanded by a driver of the vehicle. The driver's torque demands are transmitted to the ECM 150 by a driver input module 132. In some circumstances, combustion within all of the cylinders of the engine 102 may not be necessary to meet the torque demands. Accordingly, the ECM 150 may instruct a cylinder deactivation module 130 to deactivate one or more of the cylinders of the engine 102. The ECM 150 may be said to be operating in an active fuel management (AFM) mode during the time that the cylinders are deactivated.

SUMMARY

A system comprises a slip module and a gas temperature module. The slip module adjusts slipping of a clutch of a torque converter based on a first slip value before a cylinder of an engine is deactivated. The gas temperature module determines a temperature of a gas within the cylinder after the cylinder is deactivated. The slip module determines a second slip value based on the temperature of the gas and adjusts the slipping of the clutch based on the second slip value, wherein the second slip value is less than the first slip value.

In further features, the second slip value is determined after the cylinder is deactivated and the slipping of the clutch is adjusted based on the second slip value while the cylinder is deactivated. In still further features, the slip module determines the first slip value based on a manifold absolute pressure (MAP).

In other features, the system further comprises an engine cycle counter and a cooling rate module. The engine cycle counter is activated when the cylinder is deactivated and counts a number of engine cycles completed. The cooling rate module determines a cooling rate for the gas after the cylinder is deactivated. The gas temperature module determines the temperature of the gas based on the cooling rate and the number of engine cycles completed.

In other features, the cooling rate is determined based on the MAP. In further features, the system further comprises a gas determination module. The gas determination module determines an amount of the gas present within the cylinder after the cylinder is deactivated. The slip module determines the second slip value further based on the amount of the gas present within the cylinder.

In still further features, the system further comprises a leak rate module. The leak rate module determines a leak rate for the gas. The gas determination module determines the amount of gas present within the cylinder based on the leak rate and the number of engine cycles completed.

In other features, the leak rate is determined based on a temperature of the engine. In still further features, the temperature of the engine comprises at least one of an oil temperature and an engine coolant temperature.

In still other features, the system further comprises a measured slip module and an active fuel management (AFM) module. The measured slip module determines a measured slip value based on an output speed of the engine and an input speed of a transmission. The AFM module deactivates the cylinder based on a comparison of the measured slip value with the first slip value.

A method comprises adjusting slipping of a clutch of a torque converter based on a first slip value before a cylinder of an engine is deactivated, determining a temperature of a gas within the cylinder after the cylinder is deactivated, determining a second slip value based on the temperature of the gas, and adjusting the slipping of the clutch based on the second slip value, wherein the second slip value is less than the first slip value.

In other features, the second slip value is determined after the cylinder is deactivated and the slipping of the clutch is adjusted based on the second slip value while the cylinder is deactivated. In further features, the first slip value is determined based on a manifold absolute pressure (MAP).

In other features, the method further comprises counting a number of engine cycles completed after the cylinder is deactivated and determining a cooling rate for the gas after the cylinder is deactivated, wherein the temperature of the gas is determined based on the cooling rate and the number of engine cycles completed.

In further features, the cooling rate is determined based on the MAP. In still further features, the method further comprises determining an amount of the gas present within the cylinder after the cylinder is deactivated, wherein the second slip value is determined further based on the amount of the gas present within the cylinder.

In still further features, the method further comprises determining a leak rate for the gas, wherein the amount of gas present within the cylinder is determined based on the leak rate and the number of engine cycles completed. In other features, the leak rate is determined based on a temperature of the engine. In further features, the temperature of the engine comprises at least one of an oil temperature and an engine coolant temperature.

In other features, the method further comprises determining a measured slip value based on an output speed of the engine and an input speed of a transmission and deactivating the cylinder based on a comparison of the measured slip value with the first slip value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
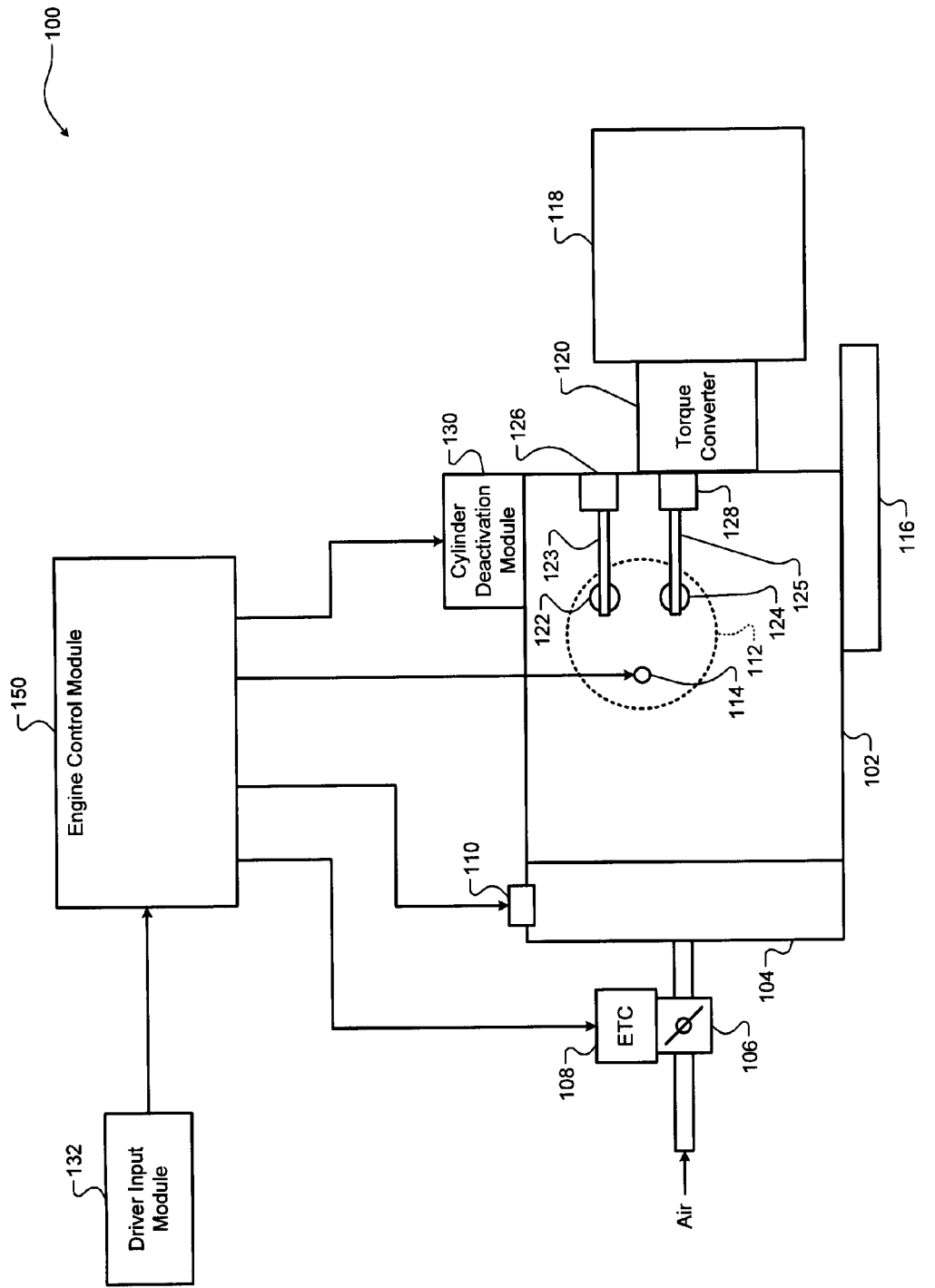
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some circumstances, an engine controller may deactivate one or more cylinders of an engine (active fuel management mode). Deactivation of the cylinders, however, causes rapid changes in output speed (and torque) of the engine, which may cause observable vibration.

The engine controller according to the present application controls a clutch of a torque converter to prevent or limit such vibration. More specifically, the engine controller commands the torque converter clutch (TCC) to slip before the AFM mode is activated. After the AFM mode is activated, the engine controller adjusts the slip of the TCC based on the temperature of gas trapped within the deactivated cylinders. The temperature of the trapped gas may be determined based on the rate at which the trapped gas cools and the number of engine cycles completed after the cylinders were deactivated. Additionally, the engine controller may adjust the slip of the TCC based on the amount of the gas that is trapped in the deactivated cylinders. The amount of the trapped gas may be determined based on the rate at which the trapped gas may escape from the deactivated cylinders (leak rate) and the number of engine cycles completed.

Figure 2:
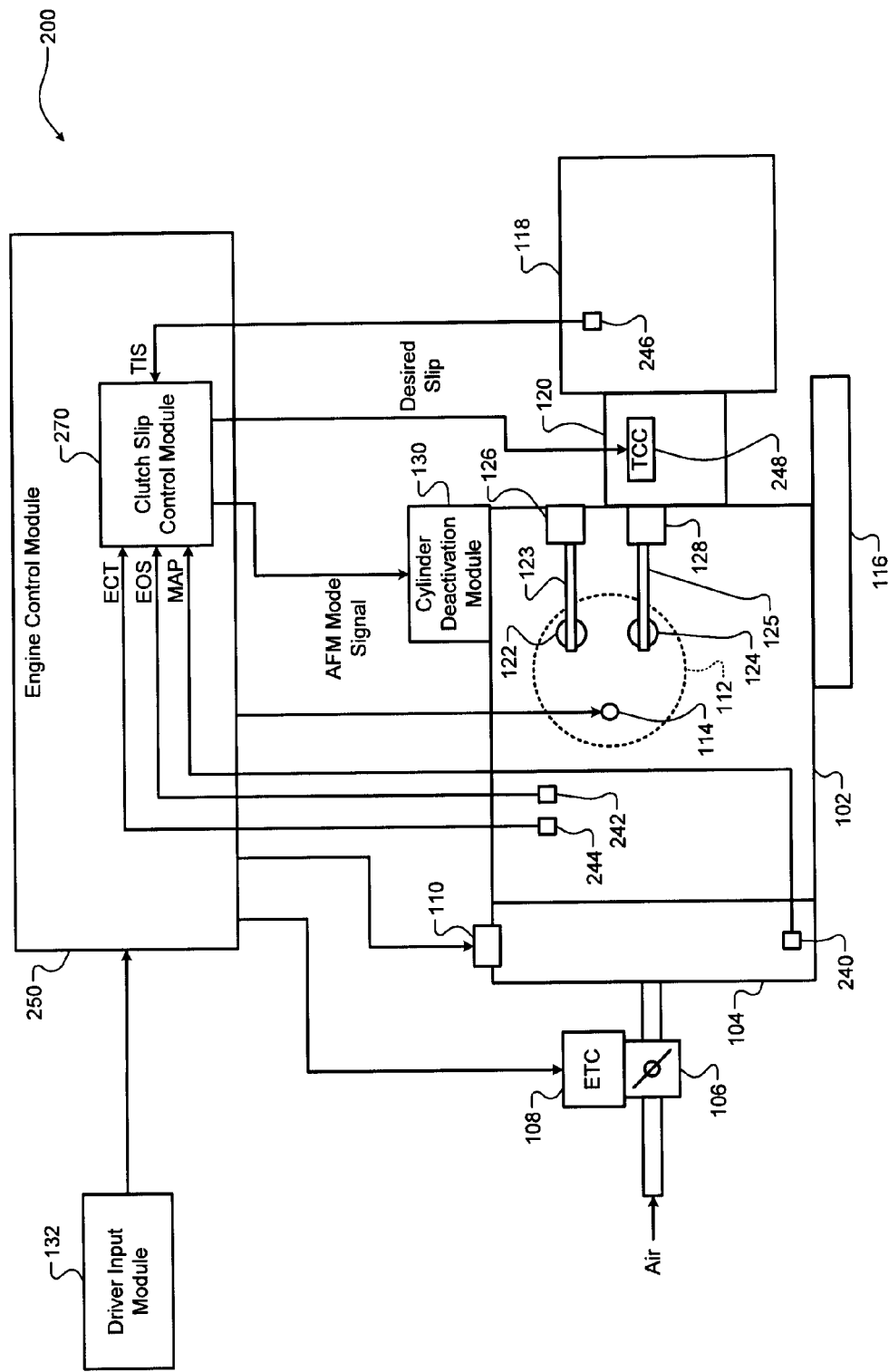
FIG. 2 is a functional block diagram of an exemplary engine system according to the principles of the present disclosure.

Referring now to FIG. 2, a functional block diagram of an exemplary engine system 200 is presented. The engine system 200 includes the engine 102 that combusts an air/fuel mixture to produce drive torque for a vehicle. Air is drawn into the intake manifold 104 through the throttle valve 106. The electronic throttle controller (ETC) 108 regulates opening of the throttle valve 106 to control the amount of air drawn into the intake manifold 104. The pressure within the intake manifold 104 is measured by a manifold absolute pressure (MAP) sensor 240.

Air from the intake manifold 104 is drawn into cylinders of the engine 102. While the engine 102 may include multiple cylinders, for illustration purposes, the single representative cylinder 112 is shown. For example only, the engine 102 may include 2, 3, 4, 5, 6, 8, 10, and/or 12 cylinders. Air from the intake manifold 104 is drawn into the representative cylinder 112 through the intake valve 122.

The fuel injector 110 injects fuel that mixes with the air and creates the air/fuel mixture in the cylinder 112. The fuel injector 110 may inject fuel into the intake manifold 104 at a central location or may inject fuel into the intake manifold 104 at multiple locations, such as near the intake valve of each of the cylinders. Alternatively, the fuel injector 110 may inject fuel directly into the cylinder 112.

A piston (not shown) within the cylinder 112 compresses the air/fuel mixture. In various engine systems, such as the engine system 200, a spark provided by the spark plug 114 ignites the air/fuel mixture. The timing of the spark may be specified relative to the time when the piston is at its topmost position, referred to as to top dead center (TDC). When the piston reaches the TDC position, the air/fuel mixture is most compressed. While the engine 102 is described as being a gasoline-type internal combustion engine, the principles of the present application apply to any suitable engine system such as a diesel-type engine system and/or a hybrid-type engine system. The spark plug 114 may not be necessary to initiate combustion in other engine systems.

The combustion of the air/fuel mixture drives the piston down (i.e., away from the TDC position), rotatably driving a crankshaft (not shown). After the piston reaches a bottom most position, referred to as bottom dead center (BDC), the piston begins moving up again (i.e., toward the TDC position) and expels the byproducts of combustion through the exhaust valve 124. The byproducts of combustion are exhausted from the vehicle via the exhaust system 116.

The intake valve 122 may be controlled by an intake camshaft 123, while the exhaust valve 124 may be controlled by an exhaust camshaft 125. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The intake cam phaser 126 controls the opening of the intake valve 122. Similarly, the exhaust cam phaser 128 controls the opening of the exhaust valve 124. The intake and exhaust cam phasers 126 and 128 adjust opening of the intake and exhaust valves 122 and 124, respectively. For example only, the timing of the opening of the intake and exhaust valves 122 and 124, respectively, may be varied with respect to piston TDC. A cylinder deactivation module 130 may deactivate one or more cylinders of the engine 102, such as half of the cylinders.

As stated above, combustion causes the piston to move down within the cylinder 112, rotatably driving the crankshaft. An engine speed (EOS) sensor 242 measures the output speed of the engine 102 and generates an EOS signal accordingly. For example only, the EOS sensor 242 may generate the EOS signal based on rotation of the crankshaft. More specifically, the EOS signal may be generated based on rotation of an N-toothed wheel (not shown) that is attached to the crankshaft. This toothed wheel may also include a gap, which may be used to identify completion of one engine cycle.

Combustion within the engine 102 generates heat. A coolant is circulated throughout the engine 102 to cool the engine 102. The temperature of the coolant may be measured using an engine coolant temperature (ECT) sensor 244. While the ECT sensor 244 is shown as being located within the engine 102, the ECT sensor 244 may be located at any suitable location where the coolant is circulated, such as a radiator (not shown).

The ECM 250 regulates torque output of the engine 102 based on, for example, various operating conditions and torque demands. For example only, the operating conditions may include the MAP and/or the ECT. Other operating conditions may include oil temperature (OT), intake air temperature (IAT), mass airflow (MAF) and/or any other suitable operating condition. The ECM 250 may receive torque demands from, for example, a driver, a traction control system (not shown), and/or a cruise control system (not shown). The driver input module 132 transmits the driver's torque demands to the ECM 250.

Torque output by the engine 102 may be transferred to the transmission 118 via the torque converter 120. More specifically, the torque converter 120 transfers torque from the output of the engine 102 to the input of the transmission 118. For example, the output of the engine 102 may be the crankshaft, and the input of the transmission 118 may be an input shaft. The input shaft of the transmission 118 drives an output shaft (not shown) when a gear is engaged. The output shaft of the transmission 118 then transfers the torque to one or more wheels of the vehicle.

A transmission input speed (TIS) sensor 246 measures the input speed of the transmission 118 and generates a transmission input speed (TIS) signal accordingly. For example only, the TIS sensor 246 may generate the TIS signal based on rotation of the input shaft of the transmission 118. More specifically, the TIS signal may be generated based on rotation of an N-toothed wheel (not shown) that is attached to the input shaft. In other implementations, the TIS may be determined based on the rotation of the output shaft of the transmission 118, which may be referred to as transmission output speed (TOS).

The torque converter 120 includes a clutch, which is referred to as a torque converter clutch (TCC) 248. The TCC 248 is generally in one of two states; a locked state or a slipping state. When in the locked state, the TCC 248 locks the input shaft of the transmission 118 to the output shaft of the engine 102. In this manner, the EOS is equal to the TIS when the TCC 248 is in the locked state.

While in the slipping state the TCC 248 is able to "slip," and unlock (i.e., disengage) the input shaft of the transmission 118 from the output shaft of the engine 102. Accordingly, the EOS and the TIS are generally not equal when the TCC 248 is in the slipping state. The difference between the EOS and the TIS in revolutions per minute (rpm) is referred to as slip value. Accordingly, the slip value represents slipping of the TCC 248. For example only, the slip value be expressed by the equation:

$$\text{Slip Value} = \text{EOS} - \text{TIS} \qquad (1)$$

where EOS is the engine output speed (rpm) and TIS is the transmission input speed (rpm). In other words, EOS is the rotational speed of the output shaft of the engine 102 and TIS is the rotational speed of the input shaft of the transmission 118.

During normal engine operation, the TCC 248 may be controlled to maintain the slip value at a predetermined value or within a predetermined range. For example only, the TCC 248 may be controlled to maintain the slip value between 30.0 rpm and 100.0 rpm during normal engine operation. In other words, the TCC 248 may be controlled to maintain the TIS between 30.0 rpm and 100.0 rpm less than the EOS during normal engine operation.

In some circumstances, the engine 102 may be capable of meeting the torque demands while combusting fuel in less than all of the cylinders of the engine 102. In such circumstances, one or more cylinders of the engine 102 may be deactivated. For example only, half of the cylinders of the engine 102 may be deactivated. The ECM 250 is said to be operating in an active fuel management (AFM) mode when one or more of the cylinders are deactivated. For purposes of clarity only, the AFM mode will be discussed as it relates to the deactivation of the cylinder 112. Other cylinders of the engine 102, if deactivated, may operate similarly or identically.

When the AFM mode is activated, the intake and exhaust valves 122 and 124 are closed after the air/fuel mixture is within the cylinder 112. The cylinder deactivation module 130 maintains the intake and exhaust valves 122 in the closed position after the air/fuel mixture is combusted. In this manner, hot gas resulting from the combustion is trapped within the cylinder 112 when the AFM mode is active. This hot gas would otherwise be expelled from the cylinder 112 via the exhaust valve 124 if the AFM mode was not active (i.e., during normal engine operation). Additionally, the ECM 250 eliminates provision of fuel and/or spark to the cylinder 112 while the AFM mode is active.

The trapped gas causes rapid changes in the torque output of the engine 102 (e.g., positive or negative). More specifically, the trapped gas causes rapid changes in the EOS. For example, the trapped gas opposes the motion of the piston as the piston moves up within the cylinder 112. This opposition of the motion of the piston causes a decrease in the EOS during the period of time that the piston is moving up in the cylinder 112.

When the piston begins to move down again, the trapped gas at the now increased pressure applies a force in the same direction as the movement of the piston. This force drives the piston down at a faster rate than would otherwise be expected during normal engine operation. In this manner, the trapped gas causes an increase in the EOS during the period of time that the piston is moving down in the cylinder 112.

These rapid changes in EOS that occur when the AFM mode is active may cause observable vibration if the TCC 248 is in the locked state or if the slip value is small. The ECM 250 includes a clutch slip control module 270 that controls the TCC 248. More specifically, the clutch slip control module 270 controls the slip value.

Before the AFM mode is activated (i.e., before the cylinders are deactivated), the clutch slip control module 270 determines a desired slip value and adjusts slipping of the TCC 248 based on the desired slip value. After the AFM mode is activated, the clutch slip control module 270 determines the cooling rate of the gas trapped in the cylinder 112. The clutch slip control module 270 then adjusts (e.g., reduces) the desired slip value based on the cooling rate and the number of engine cycles completed since the activation of the AFM mode.

Additionally, after the AFM mode is activated, the clutch slip control module 270 may determine the rate at which the trapped gas leaks from the cylinder 112 (i.e., a leak rate). The clutch slip control module 270 may then adjust the desired slip value based on the leak rate and the number of engine cycles completed since the activation of the AFM mode.

Figure 3:
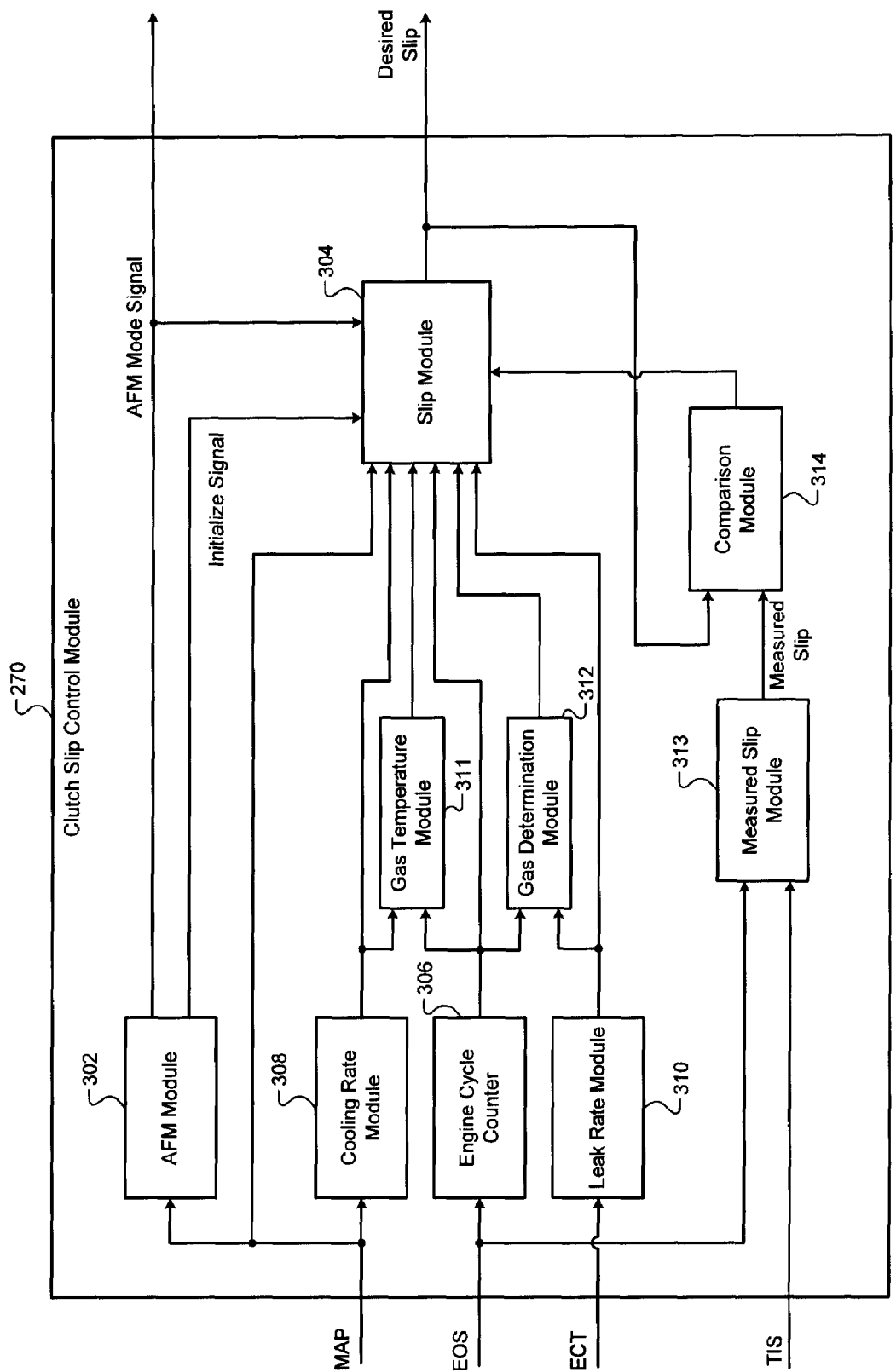
FIG. 3 is a functional block diagram of an exemplary implementation of a clutch slip control module according to the principles of the present disclosure.

Referring now to FIG. 3, a functional block diagram of an exemplary implementation of a clutch slip control module 270 is presented. The clutch slip control module 270 includes an active fuel management (AFM) module 302, a slip module 304, an engine cycle counter 306, a cooling rate module 308, and a leak rate module 310.

The AFM module 302 selectively activates and deactivates the AFM mode of the ECM 250. More specifically, the AFM module 302 selectively deactivates one or more cylinders of the engine 102 (i.e., activates the AFM mode). The AFM module 302 activates the AFM mode based on the MAP signal from the MAP sensor 240. The AFM module 302 also initializes the AFM mode before activating the AFM mode. The AFM module 302 generates an initialize signal to initialize the AFM mode based on the MAP. For example only, the AFM module 302 may generate the initialize signal when:

$$2*MAP > 0.9*MAP_{MAX}, \qquad (2)$$

where $MAP_{MAX}$ is the greatest possible MAP. For example only, $MAP_{MAX}$ may be 100.0 kPa at sea level.

The slip module 304 determines a desired slip value based on the MAP when the initialize signal is generated. The desired slip value may correspond to the difference (rpm) between the EOS and the TIS necessary to limit or prevent vibration when AFM mode is activated. The slip adjustment module 304 may determine the desired slip value based on a lookup table of desired slip value indexed by MAP. For example only, desired slip value may increase as the MAP increases.

The TCC 248 slips, i.e., disengages the output of the engine 102 from the input of the transmission 118 based on the desired slip value. In this manner, the TCC 248 slips based on the desired slip value before the cylinders are deactivated. This may be done to, for example, limit or prevent vibration that may otherwise be observed when the AFM mode is activated.

The AFM module 302 also generates an AFM mode signal, which indicates whether the AFM mode is active. For example only, the AFM module 302 may activate the AFM mode (i.e., begin generating the AFM mode signal) at a predetermined period after generating the initialize signal. In this manner, the AFM module 302 may wait for a period of time after the initialize signal is generated to activate the AFM mode. In other implementations, the AFM module 302 may activate the AFM mode after the slip value reaches the desired slip value.

The engine cycle counter 306 is activated when the AFM mode is activated. Additionally, the engine cycle counter 306 may be reset when the AFM mode is activated. For example, the engine cycle counter 306 may be reset to a predetermined reset value, such as zero when the AFM mode is activated. The engine cycle counter 306 receives the EOS signal from the EOS sensor 242 and is incremented each time one engine cycle is completed. In this manner, the engine cycle counter 306 tracks the number of engine cycles completed since the cylinders were deactivated. For example only, the completion of an engine cycle may be indicated by the gap of the toothed wheel passing the EOS sensor 242.

When the AFM mode is activated, one or more cylinders of the engine 102 are deactivated. The intake and exhaust valves 122 and 124 are closed, thereby trapping the air/fuel mixture within the cylinder 112. The air/fuel mixture is combusted, and the intake and exhaust valves 122 and 124 are maintained in the closed position. The AFM module 302 may later deactivate the AFM mode when, for example:

$$2*MAP > 0.95*MAP_{MAX}. \qquad (3)$$

The trapped (hot) gas resulting from combustion causes rapid changes in the EOS while the AFM mode is active. The magnitude of these changes in the EOS are a maximum shortly after the AFM mode is activated. This characteristic is attributable to the high temperature and, therefore, high pressure, of the trapped gas when the AFM mode is activated. The magnitude of the changes in EOS decrease as the temperature of the trapped gas decreases. The temperature of the trapped gas decreases as time passes. More specifically, the temperature of the trapped gas decreases as the number of engine cycles completed increases.

The cooling rate module 308 determines the rate at which the trapped gas is cooling (i.e., a cooling rate) based on the MAP signal. For example, the cooling rate module 308 may determine the cooling rate based on a lookup table of cooling rate indexed by MAP. For example only, the cooling rate may increase as the MAP increases. The cooling rate module 308 provides the cooling rate to the slip module 304.

Characteristics of the piston and/or the cylinder 112 may allow a portion of the trapped gas to escape from the cylinder 112. For example, a piston ring (not shown), which seals the piston with the cylinder 112, may allow a portion of the trapped gas to escape when the trapped gas is compressed. The rate at which the trapped gas escapes from the cylinder 112 may be referred to as leak rate. The leak rate module 310 determines the leak rate based on the engine temperature. The engine temperature may be determined based on the ECT, oil temperature, and/or any other suitable measure of engine temperature. For example only, the leak rate may increase as the engine temperature increases.

As the number of engine cycles completed increases, the temperature of the trapped gas decreases. As the number of engine cycles completed increases, the amount of the gas that may have escaped from the cylinder 112 may also increase. Accordingly, as the number of engine cycles completed increases, the magnitude of the changes in torque and EOS that are attributable to the trapped gas also decreases. This characteristic is discussed further with FIG. 5, below.

The slip module 304 adjusts the desired slip value based on this decrease in magnitude. More specifically, the slip module 304 reduces the desired slip value. The slip module 304 may reduce the desired slip value based on the cool-down rate, the number of engine cycles completed, and/or the leak rate.

In other words, the slip module 304 may determine how much gas has escaped since the AFM mode was activated and how much the gas has cooled since the AFM mode was activated. The slip module 304 may then determine the amount of the gas that is still trapped within the cylinder 112 and determine the temperature of the trapped gas. The slip module 304 then reduces the desired slip value based on the amount of the gas trapped within the cylinder 112 and the temperature of the trapped gas.

In other implementations, the clutch slip control module 270 includes a gas temperature module 311 and a gas determination module 312. The gas temperature module 311 determines the temperature of the trapped gas based on the cooling rate and the number of engine cycles completed. Similarly, the gas determination module 312 determines the amount of gas trapped within the cylinder 112 based on the leak rate and the number of engine cycles completed. The slip module 304 may then receive the gas temperature and the amount of trapped gas from the gas temperature module 311 and the gas determination module 312, respectively.

The clutch slip control module 270 may also include a measured slip module 313 and a comparison module 314. The measured slip module 313 determines a measured slip value based on the EOS and the TIS. For example only, the measured slip value may be the difference between the EOS and the TIS. In other words, the measured slip value may correspond to the measured difference between the rotational speeds of the output shaft of the engine 102 and the input shaft of the transmission 118.

The comparison module 314 compares the measured slip value with the desired slip value. The comparison module 314 may then indicate whether the measured slip value is equal to the desired slip value. In other implementations, the comparison module 314 may indicate whether the measured slip value is within a predetermined percentage or amount of the desired slip value. If not, the slip module 304 may then adjust slipping of the TCC 248 until the measured slip value reaches the desired slip value.

In other implementations, the measured slip module 313 may determine the difference between the measured slip value and the desired slip value and transmit the difference to the slip module 304. The slip module 304 may then adjust slipping of the TCC 248 based on the difference.

Figure 4:
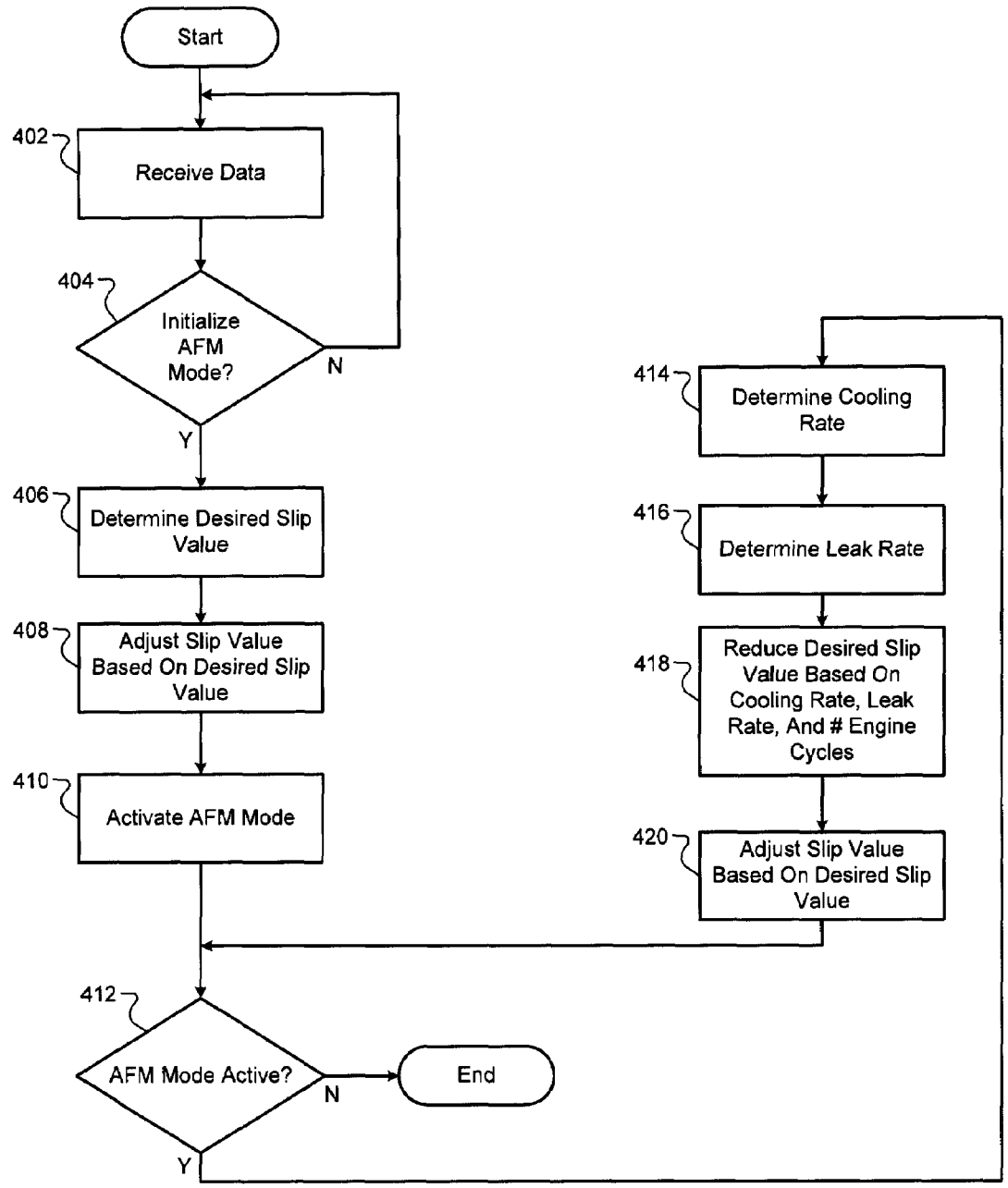
FIG. 4 is a flowchart depicting exemplary steps performed by the clutch slip control module according to the principles of the present disclosure.

Referring now to FIG. 4, a flowchart depicting exemplary steps performed by the clutch slip control module 270 is presented. Control begins in step 402 where control receives data. For example only, the data may include the MAP. Additionally, the data may include the engine temperature. Control then continues in step 404 where control determines whether to initialize the AFM mode. If so, control continues in step 406; otherwise, control returns to step 402. Control may determine whether to initialize the AFM mode based on the MAP. For example only, control may determine whether to initialize the AFM mode using equation (2) above.

Control continues in step 406 where control determines the desired slip value. The desired slip value may correspond to the difference (rpm) between the EOS and the TIS necessary to limit or prevent observable vibration when the AFM mode is activated. In step 408, control adjusts the slip value (i.e., slipping of the TCC 248) based on the desired slip value. In other words, control engages the TCC 248 based on the desired slip value. In this manner, control causes the TOS to slow such that the TIS is less than the EOS by an amount equal to the desired slip value. Control then continues in step 410 where control activates the AFM mode.

When the AFM mode is activated, the hot, combusted gas is trapped within the cylinder 112. This trapped gas causes rapid changes in EOS, which may cause observable vibrations. As the slip value is adjusted based on the desired slip value before the AFM mode is activated, control prevents the occurrence of such vibrations. In step 412, control determines whether the AFM mode is active. If so, control continues to step 414; otherwise, control ends. In step 414, control determines the cooling rate. Control determines the cooling rate based on, for example, the MAP. For example only, control may determine the cooling rate based on a lookup table of cooling rate indexed by MAP.

Control then continues in step 416 where control determines the leak rate. For example only, control may determine the leak rate based on the engine temperature. The engine temperature may be determined based on, for example, the ECT, the oil temperature, and/or any other suitable measure of engine temperature. For example only, control may determine the leak rate based on a lookup table of leak rate indexed by engine temperature. In some engine systems, the leak rate may be negligible or zero.

In step 418, control reduces the desired slip value. For example, control reduces the desired slip value based on the cooling rate, the leak rate, and/or the number of engine cycles completed since the AFM mode was activated (i.e., when the cylinders were deactivated). Continues then in step 420, where control adjusts the slip value based on the desired slip value, and control returns to step 412.

Figure 5:
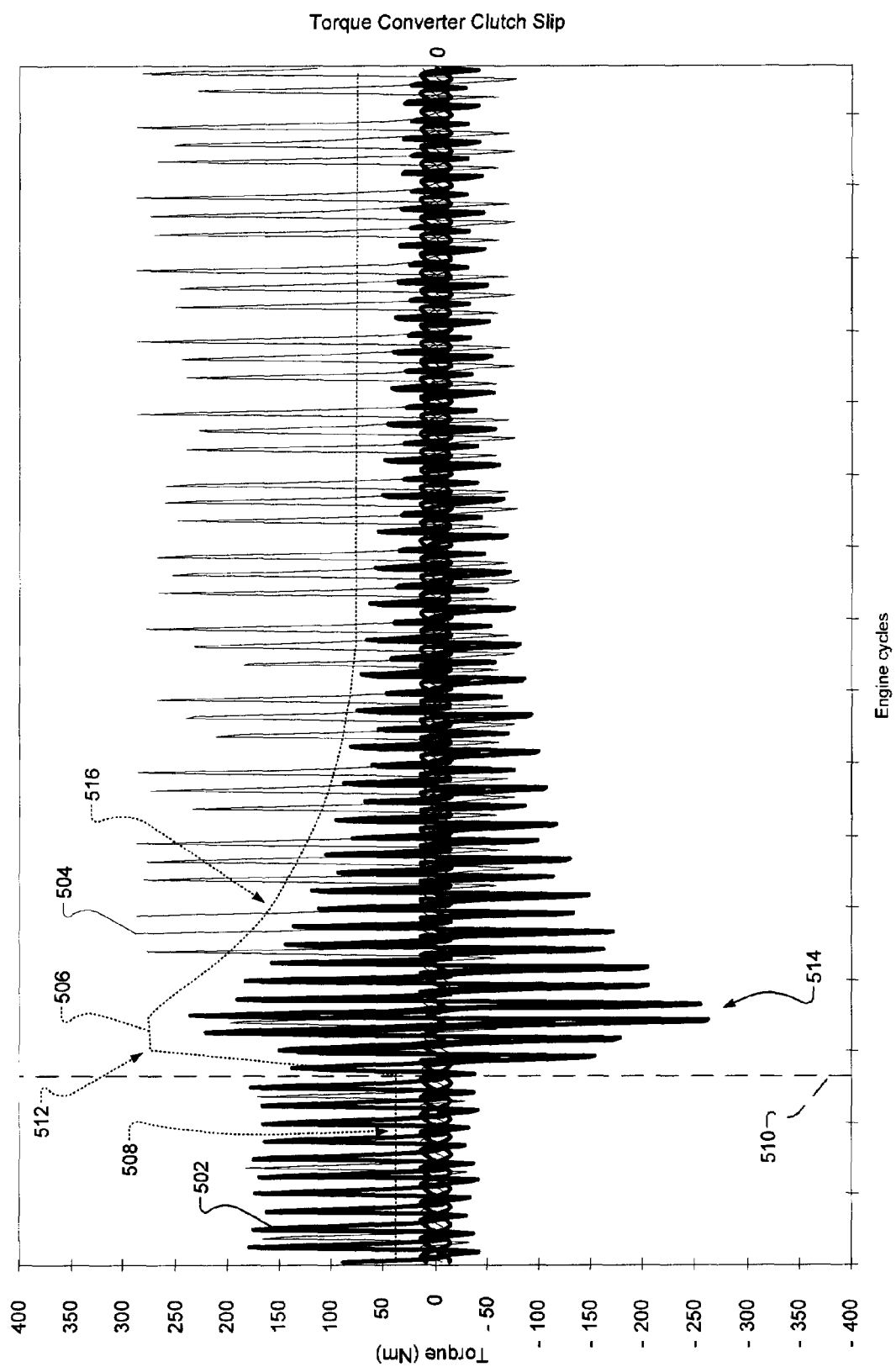
FIG. 5 is an exemplary graphical illustration of operation of the clutch slip control module according to the principles of the present disclosure.

Referring now to FIG. 5, an exemplary graphical illustration of the operation of the clutch slip control module 270 is presented. Trace 502 tracks an exemplary torque output of the cylinders of the engine 102 that are deactivated when the AFM mode is active. Trace 504 tracks an exemplary torque output of other cylinders of the engine 102 that remain active when the AFM mode is active. Trace 506 tracks an exemplary slip value.

During normal engine operation, the slip value is maintained at approximately 30.0 rpm-100.0 rpm, as depicted at 508. The clutch slip control module 270, however, increases the slip value before the AFM mode is activated. In other words, the clutch slip control module 270 increases slipping of the TCC 248 before the cylinders are deactivated.

The clutch slip control module 270 initializes the AFM mode at 510. At 510, the clutch slip control module 270 determines the desired slip value and adjusts the slip value based on the desired slip value, as shown at 512. The clutch slip control module 270 activates the AFM mode after 510.

When the AFM mode is activated, the gas resulting from combustion of the air/fuel mixture is trapped in the deactivated cylinders. The trapped gas causes rapid changes in the torque output of the engine 102, and, therefore, in the EOS. The magnitude of these changes is the greatest when or shortly after the AFM mode is activated, as depicted by the magnitude of the trace 502 at 514. This characteristic is attributable to the high temperature of the trapped gas shortly after combustion.

As time passes, the temperature of trapped gas cools. The clutch slip control module 270 determines the cooling rate of the trapped gas based on the MAP. Additionally, the clutch slip control module 270 may determine the leak rate. The leak rate may be determined based on the engine temperature. The clutch slip control module 270 reduces the slip value based on the cooling rate, the leak rate, and/or the number of engine cycles completed since the AFM mode was activated. This reduction in the slip value can be seen at 516.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a slip module that adjusts slipping of a clutch of a torque converter based on a first slip value before a cylinder of an engine is deactivated; and
a gas temperature module that determines a temperature of a gas within said cylinder after said cylinder is deactivated,
wherein said slip module determines a second slip value based on said temperature of said gas and adjusts said slipping of said clutch based on said second slip value, wherein said second slip value is less than said first slip value.

2. The system of claim 1 wherein said second slip value is determined after said cylinder is deactivated and said slipping of said clutch is adjusted based on said second slip value while said cylinder is deactivated.

3. The system of claim 2 further comprising:
a measured slip module that determines a measured slip value based on an output speed of said engine and an input speed of a transmission; and
an active fuel management (AFM) module that deactivates said cylinder based on a comparison of said measured slip value with said first slip value.

4. The system of claim 2 wherein said slip module determines said first slip value based on a manifold absolute pressure (MAP).

5. The system of claim 4 further comprising:
an engine cycle counter that is activated when said cylinder is deactivated and that counts a number of engine cycles completed; and
a cooling rate module that determines a cooling rate for said gas after said cylinder is deactivated,
wherein said gas temperature module determines said temperature of said gas based on said cooling rate and said number of engine cycles completed.

6. The system of claim 5 wherein said cooling rate is determined based on said MAP.

7. The system of claim 5 further comprising a gas determination module that determines an amount of said gas present within said cylinder after said cylinder is deactivated,
wherein said slip module determines said second slip value further based on said amount of said gas present within said cylinder.

8. The system of claim 7 further comprising a leak rate module that determines a leak rate for said gas,
wherein said gas determination module determines said amount of gas present within said cylinder based on said leak rate and said number of engine cycles completed.

9. The system of claim 8 wherein said leak rate is determined based on a temperature of said engine.

10. The system of claim 9 wherein said temperature of said engine comprises at least one of an oil temperature and an engine coolant temperature.

11. A method comprising:
adjusting slipping of a clutch of a torque converter based on a first slip value before a cylinder of an engine is deactivated;
determining a temperature of a gas within said cylinder after said cylinder is deactivated;
determining a second slip value based on said temperature of said gas; and
adjusting said slipping of said clutch based on said second slip value,
wherein said second slip value is less than said first slip value.

12. The method of claim 11 wherein said second slip value is determined after said cylinder is deactivated and said slipping of said clutch is adjusted based on said second slip value while said cylinder is deactivated.

13. The method of claim 12 further comprising:
determining a measured slip value based on an output speed of said engine and an input speed of a transmission; and
deactivating said cylinder based on a comparison of said measured slip value with said first slip value.

14. The method of claim 12 wherein said first slip value is determined based on a manifold absolute pressure (MAP).

15. The method of claim 14 further comprising:
counting a number of engine cycles completed after said cylinder is deactivated; and
determining a cooling rate for said gas after said cylinder is deactivated,
wherein said temperature of said gas is determined based on said cooling rate and said number of engine cycles completed.

16. The method of claim 15 wherein said cooling rate is determined based on said MAP.

17. The method of claim 15 further comprising determining an amount of said gas present within said cylinder after said cylinder is deactivated,
wherein said second slip value is determined further based on said amount of said gas present within said cylinder.

18. The method of claim 17 further comprising determining a leak rate for said gas,
wherein said amount of gas present within said cylinder is determined based on said leak rate and said number of engine cycles completed.

19. The method of claim 18 wherein said leak rate is determined based on a temperature of said engine.

20. The method of claim 19 wherein said temperature of said engine comprises at least one of an oil temperature and an engine coolant temperature.

* * * * *